United States Patent [19]

Scheminske et al.

[11] 3,924,939
[45] Dec. 9, 1975

[54] PORTABLE SYNC-SOUND CAMERA WITH BUILT-IN SOUND-MONITORING SYSTEM

[76] Inventors: Dennis L. Scheminske, 3000 S. Madison St., Denver, Colo. 80210; Russell L. Rayburn, 1055 Logan (Apt. 1304), Denver, Colo. 80203

[22] Filed: Nov. 25, 1974

[21] Appl. No.: 526,801

[52] U.S. Cl. .................. 352/34; 352/1; 352/25; 352/244
[51] Int. Cl.² ........................................... G03B 31/00
[58] Field of Search .............. 352/1, 2, 3, 5, 6, 25, 352/26, 27, 28, 29, 30, 34, 35, 36, 95, 129, 131, 132, 244

[56] References Cited
UNITED STATES PATENTS
2,873,645  2/1959  Horton ............................... 352/34
FOREIGN PATENTS OR APPLICATIONS
716,523  10/1966  Italy ..................................... 352/36

*Primary Examiner*—Samuel S. Matthews
*Assistant Examiner*—Russell E. Adams, Jr.
*Attorney, Agent, or Firm*—Edwin L. Spangler, Jr.

[57] ABSTRACT

This invention relates to portable sync-sound film or videotape cameras and, more particularly, to improved cameras of the aforementioned type which simultaneously record both visual and audio material on the same medium and are fitted with a self-contained speaker so-oriented relative to the viewfinder that the cameraman can continuously monitor the sound being reproduced upon the sound track or other private line audio signals while recording the visual image on film or tape, all without the benefit of auxiliary earphones or other sound reproducing headset. The invention also encompasses the use of a sponge rubber cap of substantial thickness covering the earphone that enables same to accommodate to the ear shapes and locations of different users while leaving their eye in proper position relative to the viewer.

2 Claims, 4 Drawing Figures

U.S. Patent  Dec. 9, 1975  3,924,939
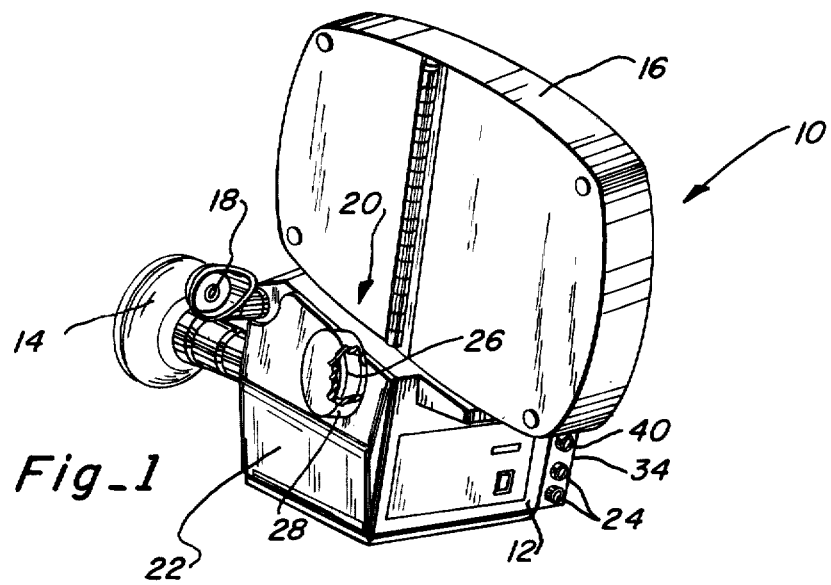
Fig_1
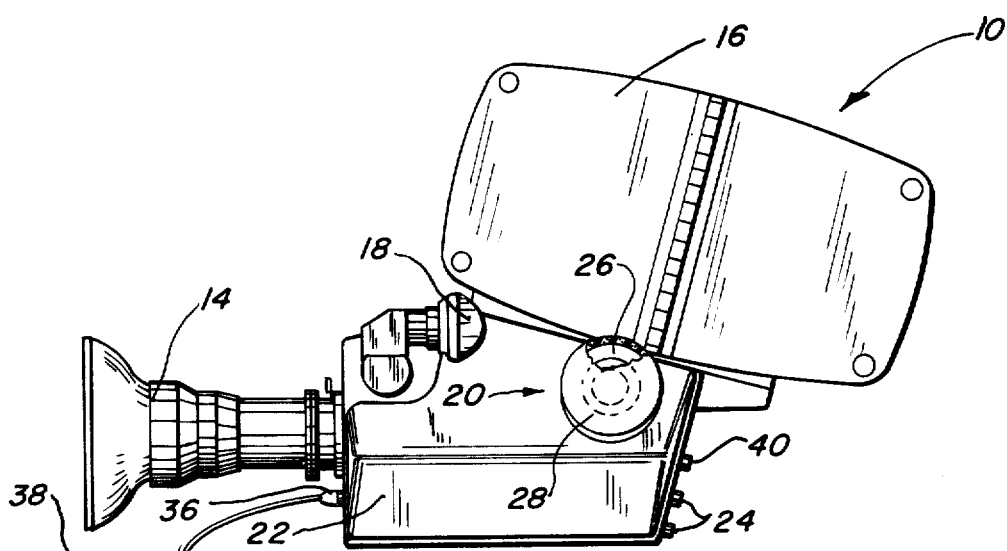
Fig_2
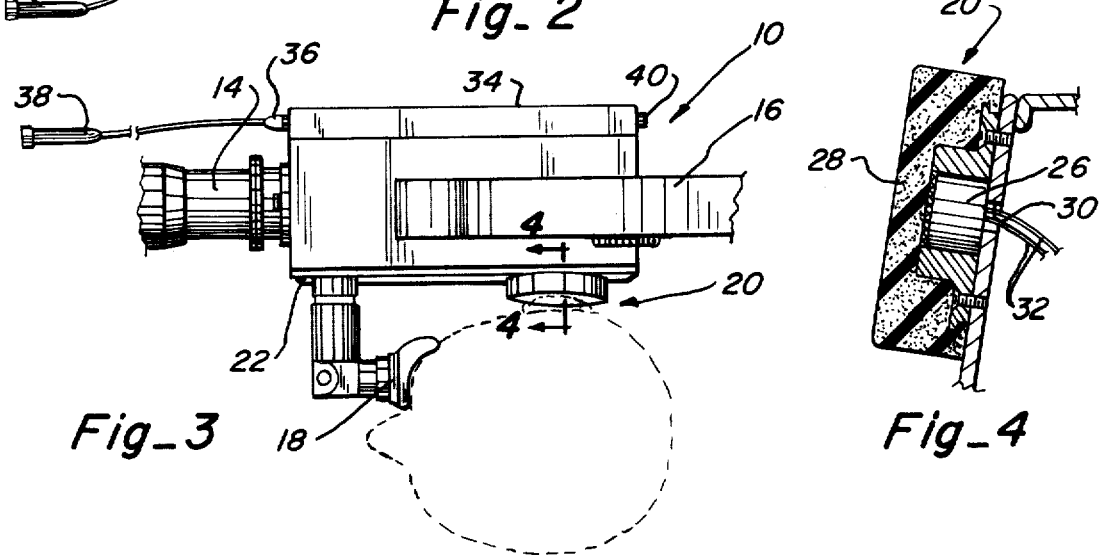
Fig_3
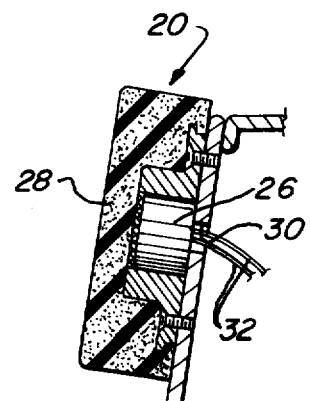
Fig_4

PORTABLE SYNC-SOUND CAMERA WITH BUILT-IN SOUND-MONITORING SYSTEM

Cameramen, especially those reporting newsworthy events for television, still shoot a good deal of silent film footage which is supplemented at the time the viewer sees it with comments from the TV news commentator, however, as time goes on, more and more sound footage is being shot on film and videotape even with portable equipment. This, of course, provides the viewer with the added dimension of natural sound recorded "on-the-spot" so to speak which is often more exciting and almost always pleasanter to watch than rhetoric which is added after the fact.

Accordingly, the sound cameraman has a two-fold responsibility in that he not only must photograph the subject in a manner that will be pleasing to the eye of the viewer but also monitor the sound that is being recorded simultaneously on the film's sound track or videotape. In addition, he must be able to receive so-called "PL" or "private line" voice communications from directors, field producers and other third parties. While this is currently being done, separate headphones are used for the purpose and they are the cause of a certain amount of inconvenience if not actual problems in the field.

To begin with, the headphones must be plugged into a headphone jack in the camera that forms a part of the sound-monitoring circuit. Such connections must, of practical necessity, be made disconnectable if for no other reason than to leave the camera unencumbered by the wires and headset when used to shoot silent film footage. As such, the connection can work loose, be pulled loose, damaged or broken even during normal use with the resultant loss of the monitoring function even though the recording capability remains viable. What's more, the cameraman cannot free a hand to plug in the jack again as both hands are needed to merely hold and operate the camera itself. When this occurs, the operator has no way of knowing about the quality of the sound recording or, in fact, if any recording has been made at all. He may even have missed or be missing important commentary and instructions from other members of the crew.

Many times the use of a headset becomes extremely impractical. For example, in inclement weather, the cameraman may wish to pull a hood up over his head but is unable to do so because of the earphones. Even more of a problem results when the operator is working under dangerous conditions where a hard-hat should be worn.

An external headset must be impedance-matched to the sound circuit within the camera for proper performance and, while this presents no great problem, a better solution is to build the unit into the camera itself. All in all, however, the best reason for incorporating the earphone speaker into the camera is one of compactness and convenience for the photographer who may, and usually is, already encumbered and overburdened with such other accessories as battery packs, light meters, battery-powered lights, extra film magazines and lenses, filters and perhaps even a tripod. While much has already been done along this line, continued efforts are required to make such cameras more compact, portable and easier to use.

It has now been found in accordance with the teaching of the present invention that these and other shortcomings of the prior art sync-sound cameras equipped with a sound-monitoring capability can, in large measure, be eliminated by the simple, yet unobvious, expedient of incorporating the sound-monitoring speaker into the camera itself. Even more significant, however, is the location of such speaker in position adjacent the ear of the cameraman when his eye is located in viewing position against the camera's viewer. In other words, when the camera is in position to be used resting on the operator's shoulder, one eye, usually the right, is looking through the viewer at the subject being photographed while an ear, again usually the right, is located against the speaker monitoring the sound being recorded on the tape or film. No external wires are present and the need for a detachable plug-in connection no longer exists. Separate protective housings for elements of the sound-monitoring system are done away with as this function is provided by the camera housing and more adequately.

While provision can be made for adjusting the position of the earphone speaker on the camera relative to the viewer so as to accommodate the ear-eye relationship of different operators, this is a complex and usually expensive solution to the problem which is more easily and satisfactorily solved by simply covering the speaker with a thick compressible elastic pad capable of transmitting sound and deforming under applied ear pressure so as to conform to the needs of the individual user. This same pad when made of sponge rubber, foamed plastics and the like has the additional, yet incidental, advantage of providing an insulating barrier between the operator's ear and thermally-responsive camera body or speaker.

Accordingly, it is the principal object of the present invention to provide a novel and improved portable sync-sound camera equipped with a built-in sound-monitoring speaker capable of monitoring the sound simultaneously recorded along with visual images on a common medium such as photographic film or videotape.

A second objective is the provision of a portable camera of the type aforementioned wherein the built-in speaker connected into the audio system of the camera is spatially oriented in a unique way such that when the camera is in use the operator's eye will be in position to look through the viewer at the same time his ear is listening to the sound emanating from the speaker.

Another object of the invention is to provide a camera of the class described in which a compressible elastic sound-transmitting pad covers the speaker and deforms to the extent necessary to accommodate differences in the eye-ear spatial relationship between different operators without having to adjust the position of the speaker.

Still another objective is to provide a portable sync-sound videotape or motion picture camera with a completely self-contained sound-monitoring system which, depending upon the design of the cameras sound system, can be used to monitor the ambient sound directly, the sound track recorded on the film or tape, or so-called "private line" sound originating from an external source such as a program director.

An additional object is the provision of a portable sound camera which is so designed that it is more comfortable for the operator to use but, more importantly, provides a steadier base for handheld shots due to the fact that the operator's ear is pressed tightly against the built-in speaker while the body of the camera rests upon his shoulder and is held up by it along with the hand actuating the handgrip control.

Further objects are to provide a sound motion picture or videotape camera that is compatible for use with foul weather gear covering the head; eliminates the set of external electrical leads normally connecting the camera and the cameraman's headset; does not interfere in any way with the normal use of the camera's sound recording and playback system; is steadier and easier to use; has fewer external trappings to break, wear and become disconnected; and, is versatile, simple to service, compact and even decorative.

Other objects will be in part apparent and in part pointed out specifically hereinafter in connection with the description of the drawings that follows, and in which:

FIG. 1 is a perspective view showing the improved sound motion picture camera equipped with a built-in sound-monitoring earphone as seen from a vantage point slightly above and to the left of its rear end;

FIG. 2 is a side elevation;

FIG. 3 is a top plan view, portions of the film magazine having been broken away to conserve space while showing in broken lines the head of the operator in position with his right eye behind the viewer and his right ear against the built-in speaker; and, FIG. 4 is a fragmentary section to an enlarged scale taken along line 4—4 of FIG. 3.

Present day commercial sync-sound cameras where both the sound and visual images are recorded on the same medium, all still use ordinary motion picture film and few, as yet, use videotape. The reasons for this, however, are technical ones having nothing to do with the sound systems. In time, surely, these problems will be overcome to an extent where portable sync-sound videotape cameras will be in commercial use and the invention forming the subject matter hereof is equally adaptable to either kind.

These cameras are either tripod mounted or handheld, quite often the latter. The bottom of the camera is designed to rest atop the operator's right shoulder while his right hand supports the front of the camera by means of a handle of some sort usually containing a single switch for simultaneously actuating both the sound system and the picture-taking apparatus. When this switch is deactuated, most cameras have provision for monitoring the ambient sound; however, upon actuation, it activates the recording system and automatically shifts to a second mode in which the sound track itself is monitored with the playback head a few milliseconds after the recording head records the sound hereon. External microphone inputs are used for recording purposes and the amplifier often makes provision for an auxiliary output whereby someone other than the camera operator can also monitor the sound by means of an external headset. These sound systems, in addition, can provide for a so-called "private line" sound input where a third party such as a field producer, director or other crew member can relay instructions to the cameraman. Looking at this feature in another way, namely, from that of the cameraman, he can listen to the commentary accompanying a live performance so as to be sure that he is photographing that which the commentator is talking about.

With this background, it is important to realize that the invention forming the subject matter hereof in no way interferes with these sound-monitoring capabilities of most professional sync-sound cameras but, instead, integrates therewith to produce a still more versatile product having increased rather than diminished capabilities.

Referring next to the drawings for a detailed description of the invention and, initially, to FIGS. 1, 2 and 3 for this purpose, reference numeral 10 has been chosen to designate in a general way a sync-sound camera of the portable type using either film or videotape and having a body 12 housing both the film transport and sound recording subassemblies (not shown), a lens 14 capable of reproducing a focused image of a remote subject at the film plane, a magazine 16 containing film along with film supply and film take-up reels and a viewfinder 18, the latter in the particular form shown being of the "through-the-lens" type containing a mirror to shift the image from the taking lens axis over to that of the viewing lens systems. Cameras such as the one illustrated are in common use with the exception of the built-in sound-monitoring system forming the subject matter of the instant invention and which has been broadly identified by reference numeral 20. Accordingly, camera 10 is intended as being merely illustrative of several such cameras which include the same basic features and which, without the exercise of more than ordinary mechanical and electrical skills can be fitted with the self-contained sound-monitoring system 20 of the instant invention.

Inside the camera body behind hinged side door 22, but over on the far side, is a complete sound recording system which picks up ambient sound generated externally, presumably by the subject being photographed, and records same on a sound track provided on the film or videotape as the case may be. The controls 24 (FIG. 1) for operating this recording system along with the film transport system, zoom lens and the like are placed on the outside of the body in positions accessible to the hands of the operator. Among the features included within the sound system of cameras of this type is an auxiliary sound output jack 40 into which the operator or a third person other than the operator can plug a headset and monitor the sound being recorded on the sound track as well as private line sound.

The improvement forming the subject matter of the instant invention comprises mounting upon the camera body a small earphone type speaker 26, an example of which is shown in FIG. 4 to which reference will now be made. This speaker in the particular form illustrated is bolted or otherwise semi-permanently attached to the same side of the camera body upon which the viewfinder 18 is located, usually the left side as these cameras are ordinarily designed for right-handed operators who will rest the camera on their right shoulder and use their right eye to look through the viewfinder.

The door 22 or similarly located side wall of the camera body is provided with a suitably positioned opening 30 through which the electrical leads that connect the speaker into the sound-monitoring circuitry pass. No attempt has been made to detail this circuity which is old in the art and forms no part of the present invention. Even so, it may be helpful to identify a few of the major externally located components of the sound system so that one may have a clearer understanding of the camera to which the present invention relates.

Returning to FIGS. 1, 2 and 3, reference numeral 34 shows an amplifier mounted on the right-hand side of the camera having a microphone input 36 on its front end into which is plugged a microphone 38. The rear end of the amplifier illustrated herein has a sound output jack 40 connected in parallel with speaker 26 which will accept an external headset (not shown) by means of which a third person can monitor the sound along with the operator.

As far as the conversion of a standard camera to accommodate the built-in monitoring system is concerned, the mechanical aspects are fairly straightforward and well within the skill of an ordinary mechanic as already outlined. The speaker can be semi-permanently mounted as shown, for example, or, alternatively, some type of slip-on detachable connection could be used. Factory installation is, of course, possible in which event the camera body would be designed to accept the speaker. The manufacturer might even offer the customer interchangeable sideplates, one equipped with the speaker 26 and another plain.

The electrical hook up is, likewise, conventional as speaker 26 need only be wired to the inside of jack 40 by means of leads 32. As already mentioned, jack 40 can be left "live" to accept an auxiliary headset for use by a third party other than the camera operator.

The single most important feature of the invention forming the subject matter hereof is the location of the speaker 26 relative to the viewfinder 18, this having been shown best in FIG. 3 where the operator's head is represented in broken lines. As shown, the right ear lies against the speaker whenever the camera is on the operator's shoulder and the eye is behind the viewer in position to view the subject being photographed.

Still another significant feature is the use of a compressible elastic sound transmitting pad 28 of substantial thickness over the speaker 26. While the location of the earphone could, if desired, be made adjustable to accommodate the ear-eye spatial relationship of different users, to do so is both complex and somewhat expensive. Instead, the resiliency and thickness of pad 28 is selected such that it will accommodate to the ear of the average user when the eye is behind the viewfinder and no adjustment is needed. On the average adult, the differences in ear placement relative to the eye vary only a half an inch or so, front to rear or vertically. Tilt of the ear is even less critical because the ear is flexible, the pad compressible, and because the head can be tilted to one side or the other a few degrees if neither of the above do the job without appreciably disturbing the view through the viewer. An incidental advantage of the pad, but nonetheless important from a comfort standpoint, is the insulating value of the pad which keeps the operator's ear away from the cold metal of the camera housing.

What is claimed is:

1. In a portable sync-sound camera of the type including a body housing sound recording and playback circuitry and an externally located viewfinder positioned in line with the operator's eye when the operator's head lies alongside said body, the improvement which comprises: an earphone-type speaker fastened to the same side of the camera body alongside which the operator's head lies when looking through the viewfinder, said speaker being electrically connected to the sound circuitry so as to monitor one or more sound inputs to the latter, and said speaker and viewfinder cooperating with one another such that when the operator has his head in position to visually monitor the subject being photographed through said viewfinder he will have an ear against said speaker in position to simultaneously monitor one or more of said sound inputs.

2. The portable sync-sound camera as set forth in claim 1 in which: a compressible elastic sound-transmitting pad covers the earphone, said pad being of a size and thickness effective to deform and conform to the ears of different operators so as to accommodate those variations in eye-ear spatial relationships as may exist therebetween.

* * * * *